United States Patent [19]  [11] 4,022,729
Prickril  [45] *May 10, 1977

[54] HOT MELT PROTECTIVE WAX COATING

[75] Inventor: William A. Prickril, Lakewood, N.J.

[73] Assignee: Cities Service Company, Tulsa, Okla.

[*] Notice: The portion of the term of this patent subsequent to Dec. 31, 1991, has been disclaimed.

[22] Filed: Mar. 27, 1975

[21] Appl. No.: 562,715

[52] U.S. Cl. .................. 260/28.5 B; 260/28.5 A; 260/32.6 A
[51] Int. Cl.$^2$ ........................................ C08L 91/06
[58] Field of Search .............................. 260/28.5 B

[56] References Cited

UNITED STATES PATENTS 3,857,805  12/1974  Prickril ..................... 260/28.5 B Primary Examiner—Lewis T. Jacobs
Attorney, Agent, or Firm—John W. Carpenter; George L. Rushton

[57] ABSTRACT

A composition comprising a hydrocarbon wax having about 10–40% by weight of oil, an ethylene/propylene/non-conjugated polyene terpolymer having a combined ethylene content of about 30–85% by weight and an iodine number of about 5–15, and said terpolymer constitutes from about 6% by weight to about 30% by weight of said composition.

10 Claims, No Drawings

HOT MELT PROTECTIVE WAX COATING

BACKGROUND OF THE INVENTION

1. Field of the Invention

This invention relates to a hydrocarbon wax composition. More specifically, this invention provides a hot melt protective wax based coating for encapsulating delicate metals, metallic parts, and the like, for protecting same from corrosion and physical damage.

2. Description of the Prior Art

My U.S. Pat. No. 3,857,805, titled Hydrocarbon Wax Composition and patented Dec. 31, 1974, discloses a composition comprising a major proportion of a hydrocarbon wax containing about 10–40% by weight of oil and a minor proportion of an ethylene/propylene/non-conjugated polyene terpolymer having a combined ethylene content of about 30–85% by weight. The compositions of the invention were specified and claimed to contain about 0.02–6% by weight of the terpolymer. For the purpose of this invention, essential material will be incorporated by reference to my U.S. Pat. No. 3,857,805.

It was discovered that compositions containing above 6% by weight of the terpolymer exhibits excellent protective coatings which have maximum toughness (shock resistant), good flexibility, good tensile strength, heat stability, good stripability, antiblocking and corrosion resistant. These properties weren't discovered in such prior art as cellulose acetate butyrate and ethyl cellulose.

SUMMARY OF THE INVENTION

An object of this invention is to provide a novel oil containing hot melt protective wax coating.

Another object is to provide such compositions which have improved properties over the prior art.

A further object is to provide such compositions economically.

These and other objects are attained by blending a hydrocarbon wax having about 10–40% by weight of oil and an ethylene/propylene/non-conjugated polyene terpolymer having a combined ethylene content of about 30–85% by weight and an iodine number of about 5–15. The terpolymer constitutes from about 6% by weight to about 30% by weight of the composition.

DETAILED DESCRIPTION OF THE INVENTION

The hydrocarbon wax and the ethylene/propylene/non-conjugated polyene terpolymer of this invention have been fully disclosed in my U.S. Pat. No. 3,857,805 which, as was previously mentioned, has been incorporated by reference. A primary difference between this invention and my U.S. Pat. No. 3,857,805 is that this invention demands a terpolymer concentration greater than about 6% by weight to impart the desired coating toughness, shock resistance, flexibility and tensile strength.

In addition to these two compounds, a number of materials may be used to decrease part of the adhesion. It is preferred that these adhesion reducing materials, release agents, represent about 0.1–0.8% by weight of the final composition (most preferred 0.5% weight) and be a solid compound with a high surface activity and a degree of incompatibility in hydrocarbon based systems. This incompatibility is not related to blending but within the blend, i.e. a migration to the surface where they can orient themselves in a near monomolecular layer to provide, in as great a measure as possible, all of the required interrelated surface characteristics such as reduced adhesion, and a degree of corrosion inhibition at the protective coating-encased metal part surface interface, and antiblocking and water repellency at the protective coating - atmosphere interface. Preferred effective adhesion reducing materials are N-alkyl-$\gamma$-hydroxybutyramides ($RNHCHOCH_2CH_2CH_2OH$) where the alkyl, well known to those skilled in the art, has between about 6 and 20 carbon atoms. Additional preferred materials are long chain saturated and unsaturated fatty amides. Examples of suitable saturated fatty amides and unsaturated fatty amides are behenamide, arachidamide, stearamide, palmitamide, myristamide, lauramide, capramide, pelargonamide, caprylamide, and erucamide, oleamide, linoleamide, linolenamide, respectively. The more preferred is a combination of long fatty chains with a highly polar group (such as an amide group) that will orient at the interfaces between phases. This gives both the desired blend incompatibility (migration) and the desired surface characteristics, such as adhesion reduction, corrosion inhibition, anti-blocking, and water repellency.

The compositions of the invention may be made by blending the aforementioned ingredients in any suitable manner which provides a major proportion of the wax and a minor proportion of the terpolymer. For example, the terpolymer may be directly incorporated into the oil-containing wax, or it may be pre-blended with a refined wax and incorporated into the oil-containing wax as a pre-blend. The latter technique is preferable both because it permits easier incorporation of the terpolymer and because chips of the pre-blend do not tend to block, or agglomerate, into a solid mass on standing at room temperature prior to being incorporated into the oil-containing wax. When this technique is used, the terpolymer is ordinarily blended with a refined paraffin or microcrystalline wax containing little or no oil to form a pre-blend having a terpolymer content of about 40–75% (e.g., about 65%;) and the pre-blend is incorporated into the oil-containing wax so as to give a terpolymer content of about 6–30%, preferably about 20%, by weight in the final composition. Any of the adhesion reducing materials may be admixed with any of the foregoing compounds at any point, as was similarly accomplished between the wax and terpolymer.

After the composition has been composed, materials to be protected such as aircraft, auto parts, bearings, dies, gears, machined parts, tools, pipe threads, etc., may be encapsulated by submerging the material or part into the final wax composition while still in liquid form (i.e. while at a temperature greater than about 150° F but less than the vaporization point). The wax liquid clings, hardens, and contracts on the respective metallic matter after being emerged and exposed to atmospheric conditions. The capsulated parts show no corrosion, even after extended periods of total water immersion and the tough coating permits physical abuse without part damage. The coating weight can be controlled by melt temperature, or preheating the metallic parts, which are well known to those skilled in the art. The application of the composition can not only be made by dipping, but also by brushing or spraying.

The following examples are given to illustrate the invention and are not intended as a limitation thereof.

Unless otherwise specified, quantities mentioned are quantities by weight.

EXAMPLE I

Part A

Melt a soft wax having an oil content of about 28–32%, pour it into a container at a temperature of about 160° F. Blend the soft wax with varying amounts of a pre-blend of 65 parts of an ethylene/propylene/non-conjugated diene terpolymer (ethylene content 40–75%; iodine number 8–10) and 35 parts of refined microcrystalline wax to form blends containing, respectively, 6.0% and 30.0% of the terpolymer. In each case, a polished metal bolt was submerged and removed to allow solidification of the wax composition. The encased metal bolt was submerged in salt water over varying lengths of time, (i.e., 1 day, 2 weeks, 1 month and 4 months) removed, and coating removed in order to check for corrosion of the same. No corrosion, tarnish or weight loss are found.

Part B

Repeat Part A except for admixing an N-alkyl-γ-hydroxybutyramide release agent to form blends containing, respectively, 0.1%, 0.5% and 0.8% of the release agent. No corrosion, tarnish or weight loss are found.

EXAMPLE II

Repeat Example I except for replacing the soft wax with a petrolatum having an oil content of about 18–20%. No corrosion, tarnish or weight loss are found.

EXAMPLE III

Repeat Example I except for replacing the soft wax with a petrolatum having an oil content of about 36–40%. No corrosion, tarnish or weight loss are found.

EXAMPLE IV

Repeat Example I except ensuring a combined ethylene content of about 30–40% and iodine number 5–8. No corrosion, tarnish or weight loss are found.

EXAMPLE V

Repeat Example I except ensuring a combined ethylene content of about 75–85% and iodine number 10–15. No corrosion, tarnish or weight loss are found.

It is obvious that many variations may be made in the products and processes set forth above without departing from the spirit and scope of this invention.

What is claimed is:

1. A composition comprising a hydrocarbon wax having about 10–40% by weight of oil, an ethylene/propylene/non-conjugated polyene terpolymer having a combined ethylene content of about 30–85% by weight and an iodine number of about 5–15, and said terpolymer constitutes from about 6% by weight to about 30% by weight of said composition, said composition additionally including an N-alkyl-γ-hydroxybutyramides release agent, said composition comprising from between about 0.1% to about 0.8% by weight of said agent.

2. The composition of claim 1 wherein the hydrocarbon wax is a paraffin wax.

3. The composition of claim 1 wherein the hydrocarbon wax is a microcrystalline wax.

4. The composition of claim 1 wherein the hydrocarbon wax is a blend of a refined hydrocarbon wax and an unrefined, oil-containing hydrocarbon wax.

5. The composition of claim 1 wherein the hydrocarbon wax contains about 15–35% by weight of oil.

6. The composition of claim 1 wherein the terpolymer has a specific gravity of about 0.84–0.89.

7. The composition of claim 6 wherein the terpolymer has a specific gravity of about 0.85–0.87.

8. The composition of claim 1 wherein the terpolymer constitutes about 8–25% of the weight of the composition.

9. The composition of claim 8 wherein the terpolymer constitutes about 20% of the weight of the composition.

10. The composition of claim 1 wherein the terpolymer has a combined ethylene content of about 40–75% by weight and an iodine number of about 8–10.

* * * * *